Aug. 1, 1967  C. B. ZAROWIN  3,334,235
PHOTOSENSITIVE FLUORESCENT LIFETIME MEASURING APPARATUS
Filed Dec. 19, 1963

INVENTOR.
CHARLES B. ZAROWIN
BY
John H. Gallagher
ATTORNEY

United States Patent Office 3,334,235
Patented Aug. 1, 1967

3,334,235
PHOTOSENSITIVE FLUORESCENT LIFETIME MEASURING APPARATUS
Charles B. Zarowin, Huntington, N.Y., assignor to Sperry Rand Corporation, Great Neck, N.Y., a corporation of Delaware
Filed Dec. 19, 1963, Ser. No. 331,889
5 Claims. (Cl. 250—217)

ABSTRACT OF THE DISCLOSURE

Apparatus for repetitively pulse illuminating a specimen of fluorescent material and for triggering the horizontal sweep of an oscilloscope upon each illumination but with an incrementally increasing delay following each illumination. A photocell coupled to the vertical deflection means of the oscilloscope detects each fluorescence of the specimen and produces a pulse display which drifts across the face of the oscilloscope. The drifting display is imaged on a second photocell, integrated and then applied to a stylus-type chart recorder to provide a smoothed time plot of the fluorescence of the specimen.

---

Figure 2:
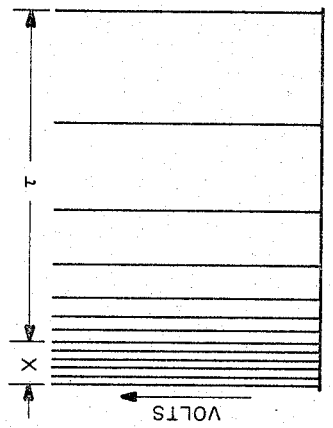

This invention relates to a combination of apparatus for automatically measuring a characteristic of a phenomenon that occurs during a repetitively occurring event and for providing an indication thereof in the form of an intensity versus time plot. As a specific example, the invention provides an accurate and reliable means for automatically performing fluorescent lifetime measurements on materials and compositions of matter that give off luminous emission when excited to, and when relaxing from, higher atomic or molecular energy levels.

In the investigation of the identity of some classes of materials and compositions of matter, and in the study of such substances, a knowledge of the fluorescent lifetime of the substance will yield useful information on its properties and characteristics. The fluorescent lifetime that is to be measured is the time interval during which fluorescence persists after excitation has terminated. The fluorescence relaxes or decays in an exponential manner after excitation ceases, so that when the relaxation time is short and/or the fluorescent emission is weak, it formerly was difficult to obtain an accurate fluorescent lifetime measurement.

A method and apparatus for obtaining more accurate fluorescent lifetime measurements is disclosed by G. E. Peterson and P. M. Bridenbaugh on pages 1079 and 1080 of the September 1962 issue of Journal of the Optical Society of America. This method in turn relies upon the stroboscopic operation of a photomultiplier tube as disclosed by C. F. Handee and W. B. Brown on pages 50–58 of the Philips Technical Review, vol. 19, 1957/58. According to this method, an exciting light source is periodically pulsed to produce short duration light pulses that excite the specimen of material being investigated. The fluorescent emission from the specimen is incident on a photomultiplier tube that normally is off, but which is pulsed to the on condition by short actuating electrical pulses that occur after continuously increasing delay intervals following the successively occurring light energizing pulses. In this manner the photomultiplier is caused to slowly scan the successively occurring fluorescent lifetimes. The pulsed photomultipler output current then is integrated over a relatively long time period and the integrated current drives a chart recorder which produces an accurate printed record of the fluorescent lifetime of the specimen of material being studied. One disadvantage of the method and apparatus disclosed in the above references, however, is that electronic modulators must be constructed for pulsing the exciting light source and the photomultiplier, and these modulators involve rather complex circuitry and require a considerable amount of engineering time and effort to achieve properly functioning circuits.

It therefore is an object of this invention to accurately measure fluorescent lifetimes of materials and compositions of matter with a combination of readily available equipment that may be interconnected and arranged in a short period of time to perform its desired function.

Another object of this invention is to provide a combination of commonly available laboratory equipment for performing fluorescent lifetime measurements.

A further object of this invention is to provide electro-optical means for automatically measuring a characteristic of a phenomenon that occurs during a repetitively occurring event and for providing a record of the measurement in the form of an intensity versus time plot.

I am able to obtain accurate lifetime measurements by employing a combination of commercially available apparatus that commonly is found in most laboratories, thus eliminating the need for specially constructing the rather complex modulating circuitry of the above-mentioned references.

In accordance with the present invention, the specimen of material under investigation is successively excited to luminescence by recurrent light pulses and the successively occurring fluorescent decays are detected by a continuously operating photomultiplier having a short time constant. During each fluorescent lifetime, during which photons are emitted from the specimen at a rate that decays exponentially, each individual photoelectron pulse from the photomultiplier is displayed on a horizontal sweep of an oscilloscope, thereby producing on the oscilloscope face a pattern of equal amplitude pulses whose number per unit distance along the horizontal sweep decreases proportionately to the rate of photon emission. This type of pattern is repeatedly displayed in synchronism with the successively occurring fluorescent relaxations of the specimen. The initiation of the horizontal sweep of the oscilloscope electron beam is increasingly delayed at a very slow rate as compared to a fluorescent lifetime so that the displayed pattern of pulses is slowly translated across the oscilloscope face and causes the earliest occurring pulses of the pattern to progressively "walk off" the scope face. The entire displayed pattern on the oscilloscope is projected upon an opaque focal plane having thereon a transparent slit whose width is approximately equal to the width of a displayed photoelectron pulse, and a second continuously operating photomultiplier having a long time constant is positioned behind the slit to produce an integrated output electrical signal in response to the successively occurring displayed pulses that drift past the slit. This integrated signal then drives a chart recorder which produces an accurate permanent record of the fluorescent lifetime of the specimen.

Figure 3:
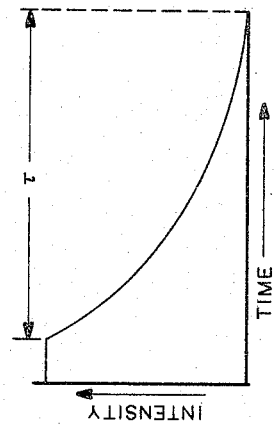
Figure 1:
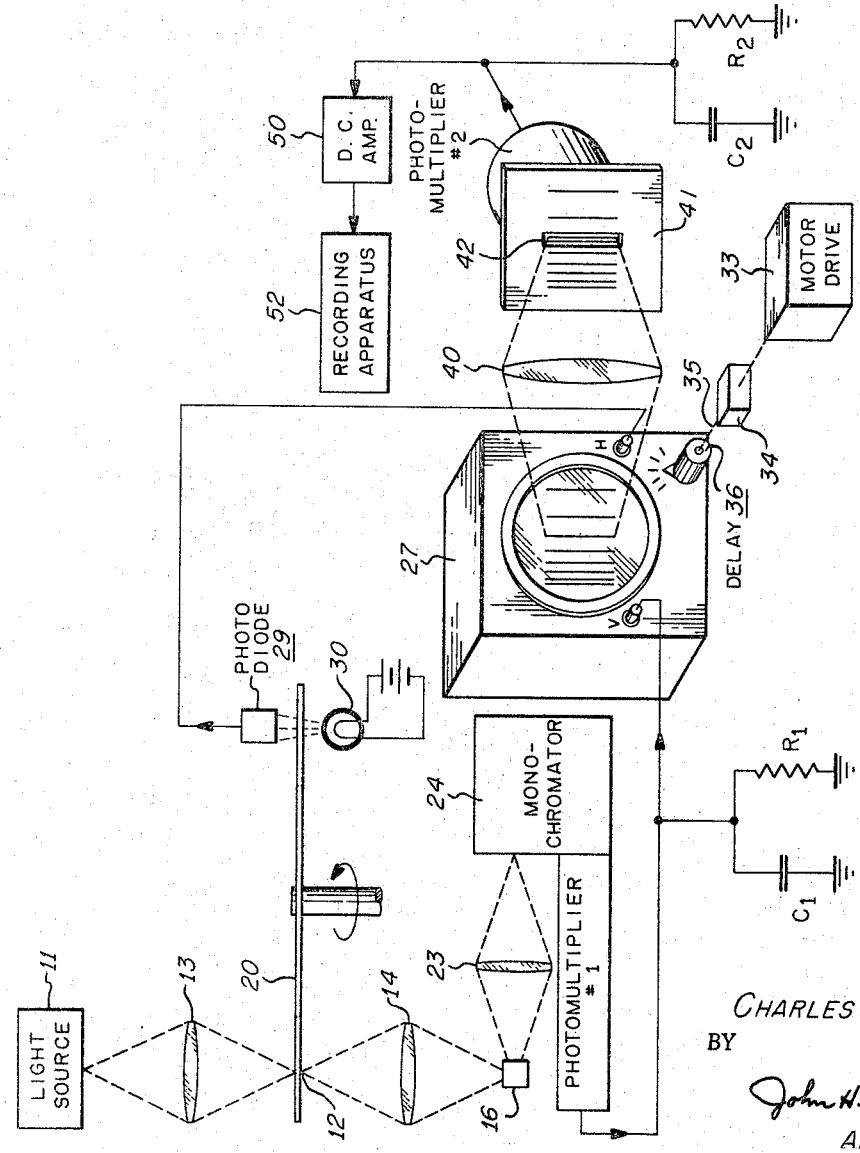

The present invention will be described by referring to the accompanying drawings wherein:

FIG. 1 is a simplified illustration, partially in block form, of the apparatus of the present invention;

FIG. 2 is an illustration of the oscilloscope display that is obtained during the course of the fluorescent lifetime measurements made with the apparatus of FIG. 1, and FIG. 3 is an illustration of the trace that is obtained on a stylus-type chart recorder, the trace being a fluorescent intensity vs. time plot that respresents the accurate fluorescent lifetime measurements that are obtained with the combination of apparatus of the present invention.

Referring now in detail to FIG. 1, a light source 11, which in practice might be a mercury-xenon arc lamp, produces a continuous light output that is brought to a focus at point 12 by means of lens 13, and is further focused by lens 14 onto a specimen 16 of a material whose fluorescent lifetime is to be studied. The continuous light from source 11 is broken up into short pulses of light by means of a continuously rotating apertured disc 20 so that the specimen 16 is excited by a continuous sequence of light pulses whose decay time is short relative to the fluorescent lifetime being measured. For reasons that will become apparent from the discussion hereinbelow, disc 20 is apertured at diametrically opposite regions of its surface. This means that two light pulses are produced for each revolution of disc 20. As an example, rotating disc 20 may produce pulses at a rate of $f$ equal to 100 pulses per second, with each pulse having a duration of 5 milliseconds.

In response to the exciting pulses of light, the atoms or molecules of specimen 16, depending upon the type of material being studied, are excited to higher energy levels and given off fluorescent light as a consequence. This fluorescence relaxes or decays in an exponential manner at the conclusion of each exciting light pulse. It is the time duration of this relaxation or decay that is to be measured.

The fluorescent light from specimen 16 is focused by lens 23 into a monochromator 24, which may be a diffraction grating, a prism, or filters that pass only a narrow frequency spectrum of light at a certain wavelength associated with particular energy levels of the excited specimen 16. This narrow spectrum of light then actuates the photomultiplier #1 which converts the light photons to pulses of photoelectrons. The time constant $T_1$ of photomultiplier #1, which is determined by the schematically represented capacitor $C_1$ and resistor $R_1$, is short, i.e., a maximum of one-tenth the fluorescent lifetime of specimen 16, so that each pulse of photoelectrons is produced in response to a photon, it being understood that in the operation of a photomultiplier device not every incident photon of light triggers a response in the device. In practice, time constant circuit $C_1$ and $R_1$ will include the parameters of the photomultiplier #1 and associated leads as well as any additional circuit components that are required to provide the desired value of $T_1$.

The photoelectron pulses from photomultiplier #1 are coupled to the vertical deflection plates of oscilloscope 27. Trigger pulses for the horizontal sweep circuit of oscilloscope 27 are produced by a photo diode 29 which is energized by pulses of light passed by rotating disc 20 from a light source 30. Because apertures in rotating disc 20 are positioned diametrically opposite each other, the light pulses that are incident on photo diode 29 occur in synchronism with the light pulses that are incident on specimen 16. Because of this time relationship of the two series of light pulses, the input pulses to the input of horizontal sweep circuit of oscilloscope 27 occur in synchronism with the photoelectron pulses applied to the vertical deflection plates. The duration of the horizontal sweep of oscilloscope 27 is long enough to assure that the fluorescent lifetime of the specimen 16 has terminated before the termination of the horizontal sweep. The electrical circuitry of oscilloscope 27 must have a short time constant in order to resolve, and thus display on the scope face, each individual photoelectron pulse. The phosphor of the oscilloscope screen should be of short persistence so that the phosphorescence due to one sweep has substantially completely decayed, before the occurrence of the next sweep. Further, oscilloscope 27 is provided with means for increasingly delaying the time that the horizontal sweep commences. This is accomplished by means of a drive motor 33 and a gear reduction mechanism 34 which, through mechanical linkage 35, continuously rotates the horizontal sweep delay knob 36 of the oscilloscope. As a result of the above-described provisions, the visual display on the face of oscilloscope 27 will appear at an instant of time as illustrated in FIG. 2. All of the pulses in the display have substantially the same duration, and are of an equal amplitude that is proportional to the charge on photomultiplier #1 divided by its capacity, i.e., $eG_1/C_1$, where $e$ is the charge on an electron and $G_1$ is the gain of photomultiplier #1. The dense and relatively regularly occurring pulses in the region X of FIG. 2 correspond to photons emitted from specimen 16 during the latter portion of its excitation period, and the region $\tau$ corresponds to the photon emission during the relaxation time, fluorescent lifetime, that commences at the conclusion of the exciting pulse. As the delay knob 36 is continuously rotated to continuously increase the delay of the commencement of the horizontal sweep, the pattern of pulses of FIG. 2 will be continuously translated to the left across the scope face and the pulses at the left side of the pattern will appear to "walk off" the scope face. The rate of change of delay of the horizontal sweep, and thus the rate of translation of the pulses on the scope face is slow relative to the horizontal sweep repetition rate so that many displays occur before a pulse is translated a slit-width distance on the scope face.

During the relaxation period $\tau$ the number of photoelectrons emitted from photomultiplier #1 and thus the number of pulses displayed per unit sweep distance on the face of the oscilloscope 27, will decrease exponentially with a time constant equal to the fluorescent lifetime of the excited energy level being investigated. When the number of these photoelectrons is small per sampling time $T_1 = R_1C_1$, the observed lifetime is subject to statistical fluctuations which may be of the order of the lifetime itself. This is overcome by sampling the low rate of arrival many times and then averaging the many samples. This is accomplished as follows:

The entire visual presentations of individual pulses on the face of oscilloscope 27 is focused by lens 40 onto a stationary opaque focal plane 41 which has a narrow transplant slit 42 therein. The width of slit 42 is approximately equal to the width of a pulse in the pattern on the face of oscilloscope 27. This arrangement for projecting the pattern on the face of oscilloscope 27 may be provided through the use of an oscilloscope camera, for example, by placing an apertured plate or card at the focal plane for the camera. Immediately behind slit 42 and responsive to the light passing therethrough is a second photomultiplier #2 that has a relatively long time constant $T_2 = C_2R_2$ so as to provide an integrated output signal. As an example, time constant $T_2$ may be of the order of one second or greater. Again, the schematically represented time constant circuit $C_2$ and $R_2$ in reality includes the parameters of photomultiplier #2 and its associated leads, as well as any necessary external circuit components.

The integrated output of photomultiplier #2 then is amplified in D.C. amplifier 50 and is coupled to some suitable recording apparatus 52 which may be a stylus-type chart recorder that provides a permanent record. The instantaneous amplitude of the output signal from photomultiplier #2 is proportional to the number of pulses on the face of oscilloscope 27 that fall within the width of slit 42 during a sampling time period equal to $T_2$, the time constant of photomultiplier #2. That is, during the time period $T_2$, there will be $fT_2$ samplings of the oscilloscope face, where $f$ is the repetition frequency of light pulses incident on photodiode 29 and on specimen 16. The type of trace produced on a chart recorder is illustrated in FIG. 3 and is drawn with the same time scale as FIG. 2 to illustrate the concept that the "time density," or rate of occurrence of pulses, as presented on the face of oscilloscope 27, has been transformed in FIG. 3 to an intensity function of time. The time period for recording the exponentially decreasing trace of FIG. 3 on the recording apparatus 52 of FIG. 1 is the time required for all the displayed pulses within the time period τ, FIG. 2, to drift pass the slit 42 on opaque focal plane 41.

In assessing the advantages derived by measuring fluorescent lifetimes with the apparatus of this invention, it will be seen from the above discussion that during each individual display of the pattern on the face of oscilloscope 27 N photons per second pass through slit 42 in opaque focal plane 41, and that during the slit-width time interval $\Delta t_s$, $N\Delta t_s$ photons pass through slit 42 (wherein $\Delta t_s$ is the time period during each horizontal sweep of the oscilloscope electron beam that light from the displayed pattern of pulses passes through slit 42). Because photomultiplier #2 samples $f$ displays per second during its integration period $T_2$, the resultant effective intensity of fluorescence is expressed by $N\Delta t_s f T_2/T_1$. In other words, the effect produced is the same as if the number of photons $N\Delta t_s$ that pass through slit 42 during each fluorescent lifetime were sampled $fT_2$ times in $T_1$ seconds. This represents an effective increase of fluorescent intensity of $(fT_2/T_1)$ over that obtained by a single sampling and direct display method. For simplicity, if $\Delta t_s$ is made equal to $T_1$, the effective fluorescent intensity becomes $NfT_2$ instead of simply N as it was in the prior art practice of detecting and directly displaying each entire fluorescent lifetime.

The accuracy of fluorescent lifetime measurements achieved in the manner described above may be viewed in either of two ways. The first viewpoint is that the effective intensity of fluorescence has been increased by the factor $fT_2$. As an example, assuming that the exciting light pulses occur at a frequency $f$ that is equal to 100 pulses per second, and that the time constant $T_2$ of photomultiplier #2 is equal to 1 second, the effective intensity of fluorescence is increased by the factor of 100. The second viewpoint is that an arbitrarily long time average may be made of the photon emission at each incremental time period of fluorescent lifetime, thus reducing fluctuations in observations by a factor $(fT_2)^{\frac{1}{2}}$, or by a factor of 10 when using the examples given above.

The advantage of performing the fluorescent lifetime measurements in the manner, and with the apparatus, described above, is that any laboratory ordinarily concerned with fluorescent lifetime measurements ordinarily will have available in the laboratory all of the equipment that is necessary to form the novel combination of apparatus, and no unusual effort is required to assemble the equipment in the desired manner. As a result, extremely accurate fluorescent lifetime measurements may be made with a minimum expenditure of time and money.

Although the above discussion deals with the use of the apparatus to measure fluorescent lifetimes, it is apparent that light intensity versus time measurements may be performed for substantially any purpose and with any appropriate light source.

Furthermore, the present invention is useful to obtain an intensity versus time indication of any of a number of different kinds of phenomena that might occur during a repetitively occurring event. For example, photomultiplier #1 may be replaced by a counter of some type such as one of the Geiger types or scintillation types, and charged particles that result from some repetitively occurring event may be detected and their rate of occurrence or their rate of flow will be recorded as an intensity versus time plot.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A combination of apparatus for performing accurate fluorescent lifetime measurements on a material that fluoresces in response to applied energy, said combination comprising,
   a specimen of fluorescent material,
   means for applying successively occurring short-duration pulses of exciting energy to said specimen,
   said specimen responding to said exciting energy by emitting corresponding photon pulses of fluorescent light that decay in an exponential manner at the termination of each exciting energy pulse,
   means responsive to the fluorescent photon emission of said specimen for producing during each fluorescent lifetime of the successively excited specimen a series of photoelectron pulses corresponding to the photon emission of the specimen,
   display means for presenting a visual light display of said photoelectron pulses during each fluorescent decay and for causing the commencement of the successive displays to occur at different times in the respective successively occurring fluorescent lifetimes, whereby the successively displayed photoelectron pulses are drifted in position with respect to the display means,
   light detecting and signal producing means stationary with respect to said display means for responding to the light from only a narrow fixed area of the display means on which the drifting photoelectron pulses are displayed and for producing an electrical signal in response thereto,
   said light detecting and signal producing means possessing a long time constant characteristic to produce an integrated output electrical signal in response to incident photons, and
   utilization means responsive to the output signal of the light detecting and signal producing means.

2. A combination of apparatus for performing accurate fluorescent lifetime measurements on a material that fluoresces in response to applied pulses of exciting energy, said combination comprising,
   a specimen of fluorescent material,
   means for applying successively occurring short-duration exciting pulses of energy to said specimen,
   said specimen responding to said pulses of energy by emitting corresponding photon pulses of fluorescent light that decay in an exponential manner at the termination of each exciting pulse,
   means for responding to the fluorescent photon emission of said specimen and for producing during each fluorescent lifetime of the successively excited specimen a series of electron pulses corresponding to the photon emission of the specimen,
   an oscilloscope having an electron beam that is swept across its face during each of the successively occurring fluorescent lifetimes and being coupled to receive said series of electron pulses for producing during each fluorescent lifetime a series of visual pulses corresponding to said electron pulses,
   means for progressively changing the time of commencement of the successive sweeps of the oscilloscope beam,
   whereby the visual pulses drift in position across the oscilloscope face,
   means for transmitting the light of the visual pulses from only a narrow fixed area on the face of the oscilloscope where the visual pulses appear,
   means possessing a long time constant characteristic and responsive to the light transmitted from the narrow fixed area of the oscilloscope face for producing an integrated electrical signal in response thereto, and
   utilization means responsive to said integrated electrical signal.

3. A combination of apparatus for performing accurate fluorescent lifetime measurements on a material that fluoresces in response to applied pulses of light, said combination comprising,
   a specimen of fluorescent material, means for applying successively occurring short-duration light pulses to said specimen, said specimen responding to said exciting light pulses by emitting corresponding photon pulses of fluorescent light that decay in an exponential manner at the termination of each exciting light pulse, a first photomultiplier means possessing a short time constant characteristic for responding to the fluorescent photon emission of said specimen and for producing during each fluorescent lifetime of the successively excited specimen a series of photo-electron pulses corresponding to the photon emission of the specimen, an oscilloscope having an electron beam that is swept across its face during each of the successively occurring fluorescent lifetimes and being coupled to said photomultiplier means for producing during each fluorescent lifetime a series of visual pulses corresponding to said photoelectron pulses, means for progressively changing the time of commencement of the successive sweeps of the oscilloscope beam, whereby the displayed pulses that correspond to photoelectron pulses drift in position across the oscilloscope face, means for transmitting the light from only a narrow fixed area on the face of the oscilloscope where the displayed pulses appear, a second photomultiplier means possessing a long time constant characteristic and responsive to the light transmitted from the narrow area of the oscilloscope face for producing an integrated electrical signal in response thereto, and recording apparatus responsive to said integrated output signal of the second photomultiplier means for providing a visual indication of said integrated output signal.

4. Apparatus for performing accurate fluorescent lifetime measurements on a specimen of a material, said apparatus comprising the combination, means for successively exciting a specimen of material to a short-duration photon emissive luminescence whose fluorescent lifetime commences at the conclusion of the excitation, a first light responsive means for responding to the light output of said specimen and for producing during each fluorescent lifetime a succession of electrical pulses that occur at a rate that is proportional to the rate of photon emission from said specimen during its fluorescent lifetime, a cathode ray tube having horizontal and vertical deflection means, means for coupling said electrical pulses to the vertical deflection means of the cathode ray tube, means coupled to said horizontal deflection means for successively horizontally sweeping the beam of the tube at progressively changed time intervals following the successive excitations of said specimen, whereby pulses corresponding to said electrical pulses are visually displayed on said cathode ray tube and said visual pulses drift across the face of the tube, means for viewing only a narrow fixed area on the face of said tube across which said visual pulses drift, a second light responsive means for receiving only light passed through said narrow fixed area of the tube face and for producing integrated output signals in response to light pulses incident thereon.

5. The combination claimed in claim 4 and further including chart recording apparatus coupled to receive said integrated output signals for producing a permanent record of the fluorescent lifetime of said specimen.

References Cited

UNITED STATES PATENTS

| 2,828,425 | 3/1958 | Greenblatt | 250—233 X |
| 2,907,888 | 10/1959 | Maure et al. | 250—217 |
| 2,971,429 | 2/1961 | Howerton | 250—77 |
| 2,092,722 | 6/1963 | Howerton | 250—77 |

OTHER REFERENCES

Paterson et al.: Journal of the Optical Society of America vol. 52, September 1962, pp. 1079, 1080.

WALTER STOLWEIN, *Primary Examiner.*